United States Patent Office 3,626,776
Patented Dec. 14, 1971

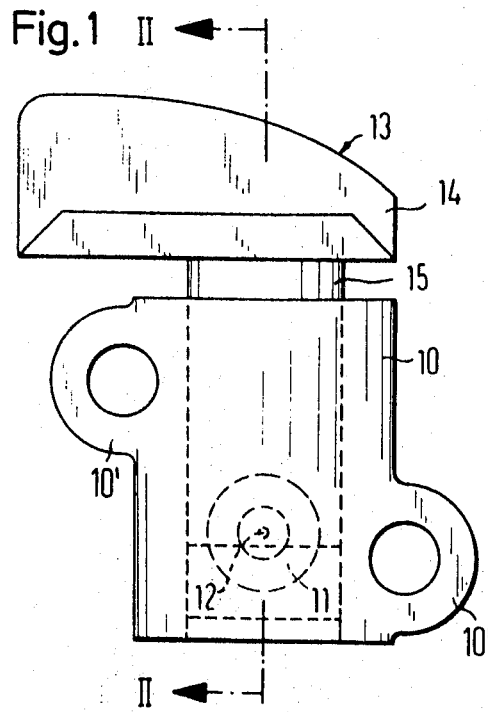
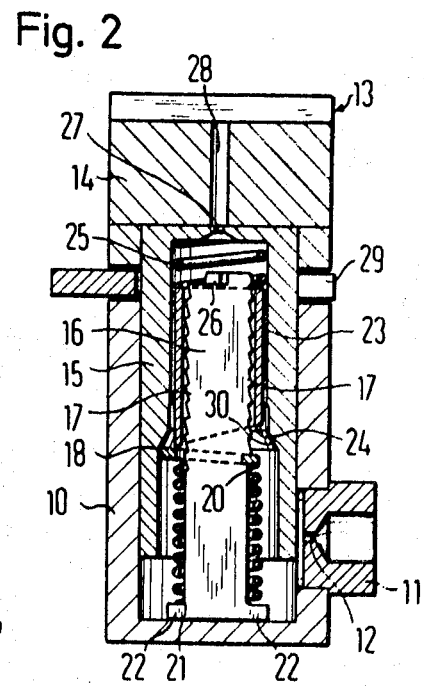
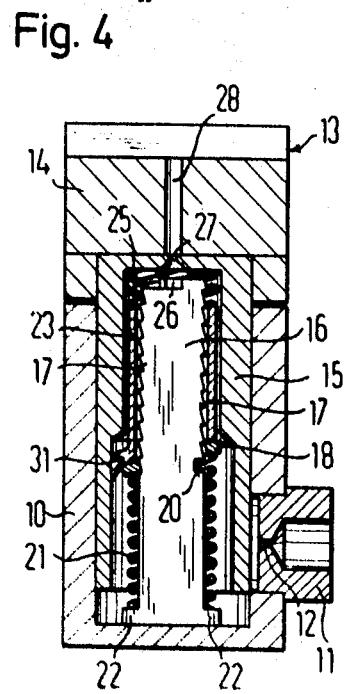
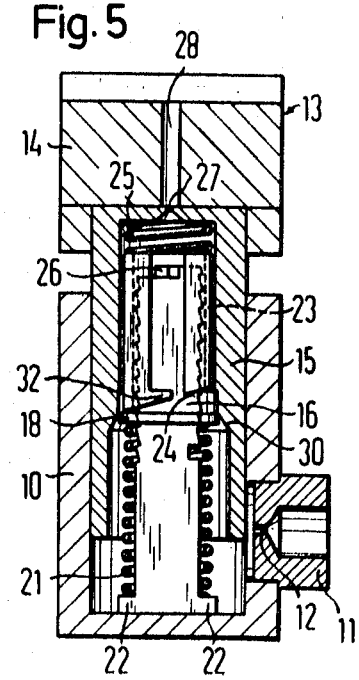
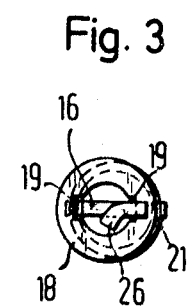
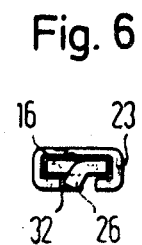

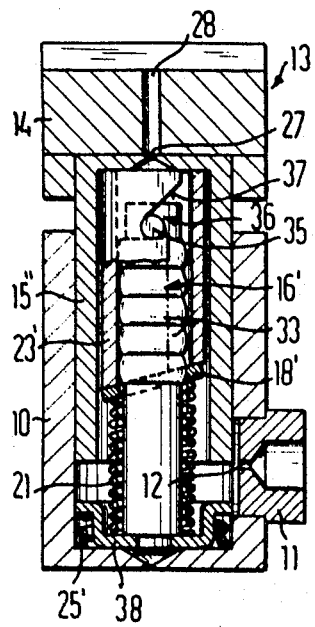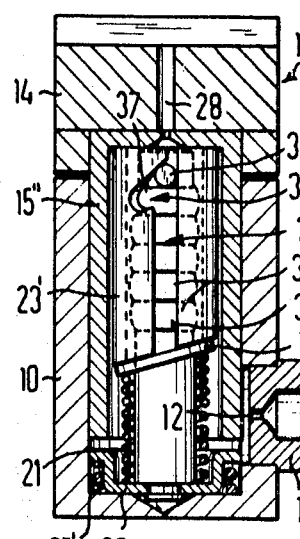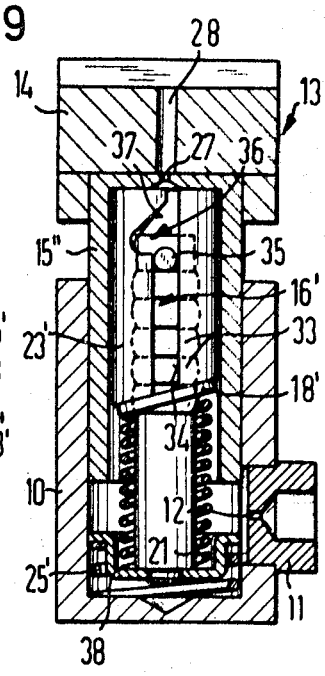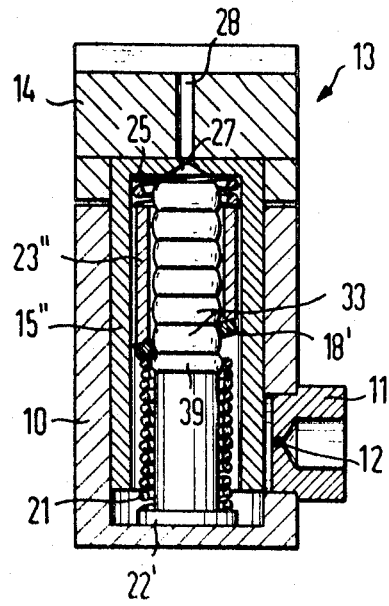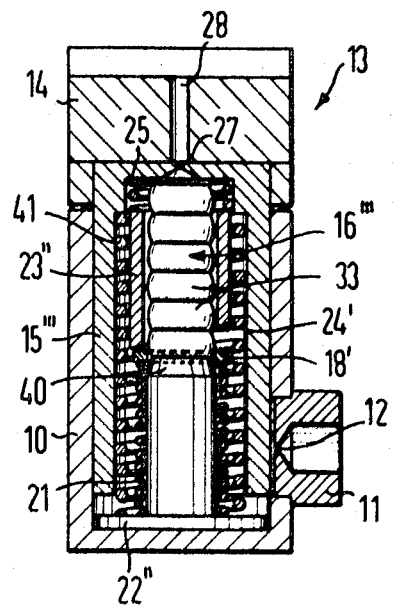

3,626,776
CHAIN TENSIONING DEVICE
Siegfried Staudinger, Munich, Manfred Klimiont, Geretsried, and Hermann Zollner, Munich, Germany, assignors to Joh. Winklhofer & Söhne, Munich, Germany
Filed Aug. 27, 1970, Ser. No. 67,521
Claims priority, application Germany, Sept. 15, 1969,
P 19 46 651.4
Int. Cl. F16h 7/12, 7/10
U.S. Cl. 74—242.11 S
17 Claims

ABSTRACT OF THE DISCLOSURE

A chain tensioning device in which a tensioning member is telescopically received in said casing is provided with a locking arrangement including an elongated abutment member formed with two rows of receptacles extending in the direction of movement of the tensioning member and a detent dimensioned for simultaneous engagement with receptacles of the two rows. A spring in the casing biases the detent toward the open end of the casing, and the spring force is transmitted to the tensioning member by an interposed pressure transmitting member having a face for engagement with the detent and obliquely inclined relative to the direction of movement of the tensioning member.

---

This invention relates to tensioning devices for chains and like tension elements, such as cables or belts, and more particularly to an improved tensioning device of the general type disclosed in the Seaman Pat. No. 3,252,347.

In the type of tensioning device with which this invention is more specifically concerned, a tensioning member is partly received in a casing for telescoping movement. The casing may be fixedly mounted, and a pad on the tensioning device may engage the tension element to be tightened when the tensioning member is pushed out of the casing. Springs are normally provided to bias the tensioning member outward of the open end of the casing, and a locking device prevents significant movement of the tensioning member inward of the casing under the force applied to the tensioning member by the tension element which it is desired to tighten.

Some of the devices of this type are quite complex in their structure and require frequent maintenance work. Others have loosely assembled parts which tend to be lost when the device is disassembled for setting or for maintenance. Yet others are bulky, and thereby limited in their applications.

The object of the invention is the provision of a tensioning device for tension elements which consists but of few, rugged parts and is simply constructed so as to give long, trouble-free service and to require little space.

With this and other objects in view, the invention, in one of its aspects, provides a tensioning device for a chain and like tension element which has a casing and a tensioning member. A first portion of the latter is received in the casing in the operative condition of the device, and a second portion is outside the casing. The first portion is guided in the casing for movement of the tensioning member in a direction inward and outward of the casing through the open casing end. A connection is provided on the second portion for connecting the tensioning member to the tension element. Movement of the tensioning member in the inward direction under forces applied to the connection can be prevented substantially by a locking arrangement which includes an abutment member formed with two rows of receptacles, each row extending in the direction of movement referred to above, and being spaced transversely from the other row. A detent member extends in a plane and is dimensioned for simultaneous engagement with respective receptacles of the two rows when its plane is obliquely inclined relative to the direction of movement.

Yieldably resilient means in the casing bias the detent member in a direction outward of the casing, and the biasing force is transmitted to the tensioning member by a pressure transmitting arrangement which has a face portion defining an abutment face for engagement with the detent member and obliquely inclined relative to the direction of movement of the tensioning member.

Other features, additional objects, and many of the attendant advantages of this invention will readily become apparent as the same becomes better understood by reference to the following detailed description of preferred embodiments when considered in connection with the appended drawing in which:

FIG. 1 shows a chain tensioning device of the invention in side elevation;

FIG. 2 illustrates the apparatus of FIG. 1 in section on the line II—II in a different operating position;

FIG. 3 shows a sub-assembly of elements of the device of FIG. 1 in top plan view;

FIG. 4 shows a modification of the device of FIG. 2 in a corresponding view;

FIG. 5 is a view of the device of FIG. 2 in another operating position;

FIG. 6 shows elements of the same device in top plan view;

FIG. 7 illustrates yet another embodiment of a tensioning device of the invention in elevational section;

FIGS. 8 and 9 are corresponding views of the device of FIG. 7 in different operating positions; and FIGS. 10 and 11 illustrate additional tensioning devices of the invention in respective elevational sections.

Referring now to the drawing in detail, and initially to FIG. 1, there is seen a chain tensioning device having a tubular casing 10 provided with lugs 10' for mounting on a fixed structure. A grease nipple 11 whose bore has a portion 12 restricted to capillary dimensions radially projects from the casing 10 near its closed axial end, hereinafter referred to as the lower end for convenient description, it being understood that operativeness of the device is independent of its orientation in the field of terrestrial gravity.

A tensioning member 13 essentially consists of a chain-engaging pad 14 and of a cylindrical tubular portion 15 telescopically slidable inward and outward of the open, upper, axial end of the casing 10, the portion 15 being conformingly received in the bore of the casing.

As is better seen in FIGS. 2 and 3, a sheet metal strip 16 is axially elongated in the casing bore. The upper halves of its longitudinal edges are notched so as to form rows of saw teeth 17, the points of the teeth 17 being directed obliquely upward on one edge and obliquely downward on the other edge. The strip 16 passes through the opening in an annular disc 18 of sheet metal, hereinafter referred to as the "detent." The dent 18 has a circular outer circumference, and an inner circumference whose otherwise circular shape is interrupted by two diametrically opposite, radial recesses 19. The greatest internal diameter of the detent 18, as measured across the recesses 19, is only silghtly greater than the width of the strip 16. In the position shown in FIG. 2, the detent 18 is partly received in a deep notch 20 at the lower end of one row of saw teeth 17 in the strip 16. A helical compression spring 21 coiled about the lower half of the the strip 16 abuts in stressed condition between the detent 18 and lateral projections 22 at the lower end of the strip 16.

A pressure-transmitting sleeve 23 loosely envelops the strip 16. As is best seen in FIG. 6, it is generally rectangular in cross section and axially slotted, the width of the slot being such that the sleeve 23 extends around the strip 16 in an arc of more than 180°, and approximately 270° relative to the axis of the casing 10. A bottom face 24 of the sleeve 23 is obliquely inclined relative to the axis, and its lowermost portion rests on the part of the detent 18 diametrically opposite the notch 20. A helical compression spring 25 is axially interposed between the top end of the sleeve 23 and the face of the tensioning member 13 which upwardly bounds the bore of the tubular portion 15. An integral lug 26 projects from the strip 16 near the upper end of the latter into the slot of the sleeve 16, as is best seen in FIG. 6. The inward stroke of the tensioning member is limited by abutting engagement of the pad 14 with the casing 10.

The clearance between the tubular portion 15 and the sleeve 23 is sufficient to permit lubricant admitted through the nipple 11 to pass upward and through a throttling orifice 27 of capillary dimensions into an axial duct 28 in the pad 14 which is axially open so that all parts of the tensioning device may be lubricated in a simple manner.

For storage and transfer to a place of intended application, the tensioning member 13 is held in the partly extended position illustrated in FIG. 2 by insertion of a fork 29 between the casing 10 and the pad 14. When the apparatus is to be made ready for use, the fork is withdrawn, and the tensioning member 13 is pushed axially inward of the casing into a position corresponding to that of a modified embodiment in FIG. 4. The bore of the tubular portion 15 has two cylindrical sections, the narrower upper section being connected with the wider lower section by a conical cam face 30 (FIG. 5).

During the inward movement of the tensioning member 13 from the position of FIG. 2, the cam face 30 engages the detent 18 and moves it into a position in which it is centered in the casing axis and thereby disengaged from the notch 20. When the tensioning member 13 is released, the spring 21 shifts the detent 18 into the position seen in FIG. 5 in which it abuts against the lowermost portion of the bottom face 24 on the sleeve 23, whereby the pressure of the spring 21 is transmitted to the pad 14 to bias the pad in a direction outward of the open upper end of the casing, and thereby to tension a chain engaged by the pad.

The opposite side of the detent pivotally abuts against the steep or short flank of one of the teeth 17 of the strip 16 until outward movement of the tensioning member 13 and of the sleeve 23 causes the detent 18 to be tilted sufficiently to let it move over the tooth and into engagement with the next higher tooth 17 on the right side of the strip 16, as viewed in FIG. 5. Inward movement of the detent is limited by the teeth 17 on the left side of the strip 16 as long as the teeth on the right side are held in engagement by the spring 21.

A lug 32 integral with the sleeve 23 projects into the slot of the latter near the bottom face 24. When the tensioning device is fully expanded, the lug 32 abuttingly engages the afore-mentioned lug 26 on the strip 16 and prevents further axial movement of the tensioning member 13 relative to the strip. The latter is loosely inserted in the bore of the tubular portion 15 and in the casing 10. The tensioning member 13 and associated elements may thus be withdrawn and reinserted without difficulty in the assembled condition, and no particular skill is needed to avoid the loss of parts.

The modified tensioning device illustrated in FIG. 4 is identical with that described above with reference to FIGS. 1–3, 5, and 6 except for a skirt 31 on the lower end of the otherwise unchanged sleeve 23. When the tensioning member 13 is pushed inward of the casing 10 to make the device ready for use, the skirt 31 enters the wide annular space below the lower bore section of the tubular portion 15' and the detent 18 and cammingly engages the latter to dislodge it from the notch 20.

Of the many modifications of which the apparatus of FIGS. 1–3, 5, and 6 is capable without basic change in operating principles, a few more are illustrated by way of example in FIGS. 7 to 11.

The tensioning device illustrated in three operating positions in FIGS. 7, 8, and 9 respectively, has a central elongated abutment element 16', analogous in function to the strip 16, which is a column of generally circular cross section which varies along the axial length of the column in such a manner that the upper portion of the column has five contiguously juxtaposed axial sections 33 of convex, spherical curvature defining annular grooves of V-shaped section in an axial plane. The grooves provide receptacles for a detent 18' in the manner of the notches between the sawteeth 17 in the afore-described strip 16. The detent 18' is a flat ring or washer.

A pin 35 radially projects from the column 16' near the upper end of the latter and is dimensioned for free movement in an axial slot 34 of a pressure-transmitting, cylindrical sleeve 23' which envelops the upper portion of the column 16'. A recess 36 in one of the sides of the slot 34 has a bottom wall approximately perpendicular to the slot 34 and a top wall 37 which slopes obliquely upward. When the tensioning member 13 is pushed into the casing 10 almost to the end of its stroke and thereafter turned about its axis, the pin 35 enters the recess 36 and thereafter prevents axial expansion of the tensioning device in the manner of a bayonet closure, as may be needed during storage or during transfer of the device to a place of intended application (FIG. 7).

The sleeve 23' directly abuts against the closed upper end of the tubular portion 15" and is biased outward of the casing 10 by a helical compression spring 21 interposed between the detent 18' and a cup-shaped flange 38 on the bottom end of the column 16'. The detent 18' is normally held in area contact with the oblique bottom face of the sleeve 23' unless it pivots about a groove between the sections 33. A short compression spring 25' between the flange 38 and the closed bottom of the casing 10 facilitates the rotation of the sleeve 23' by the frictionally engaged tensioning member 13.

When it is desired to make the apparatus of FIG. 7 ready for use, the tensioning member is pushed further inward of the casing 10 until the obliquely sloping top wall 37 of the recess 36 shifts the cammingly engaged pin 35 circumferentially into alignment with the slot 34 (FIG. 8). When the axial pressure thereafter is released, the tensioning apparatus expands under the pressure of the springs 21, 25'.

The column 16" illustrated in FIG. 10 differs from the afore-described column 16' by having a radial flange 22' at its lower end which rests on the closed bottom of the casing 10, and a short, helical compression spring 25 arranged between the top edge of a pressure transmitting sleeve 23" and the closed top of the tubular portion 15". The upper portion of the column 16" has six spherically arcuate surface sections 33 analogous to the corresponding elements in FIGS. 7 to 9. An axially short, convexly toroidal rib 39 between the lowermost section 33 and the lower cylindrical part of the column 16" is so dimensioned that the reduced uppermost turn of the spring 21 abuts against the rib and the flange 22', but can slip over the rib when tilted from the radial plane in which it extends in the position of FIG. 10. The rib 39 passes freely through all other turns of the spring 21.

The tensioning device shown in FIG. 10 does not expand spontaneously in an axial direction. It may therefore be stored and installed in the illustrated condition. During use, it is normally subjected to vibration transmitted from a chain and like tensioned element and sufficient to release the spring 21 from the rib 39 whereupon the tensioning device functions as described above, the detent 18' advancing from one annular receptacle between adjacent sections 33 to the next as the relaxation of the non-illustrated chain permits expansion of the tensioning device.

The apparatus illustrated in FIG. 11 differs from the device described with reference to FIG. 10 by a column 16''' flaring conically downward from an annular groove beneath the lowermost spherically arcuate section 33. The largest diameter of the conical surface portion 40 is greater than the internal diameter of the detent 18', and the greatest diameter of the contiguously adjacent section 33 is also sufficient to retain the detent 18' when it extends in a radial plane as illustrated. It is held in that plane in a newly assembled tensioning device by the spring 21 whose lower end abuts against a radial flange 22'' on the lower end of the column 16'''. The diameter of the flange 22'' is almost equal to the inner diameter of the casing 10 so that it may be engaged by an auxiliary spring 41 received in the tubular portion 15''' and enveloping the spring 21 and the pressure transmitting sleeve 23''. The spring 41 axially abuts against the closed top of the tubular portion 15'''. The bottom face 24' of the sleeve 23'' is obliquely inclined relative to the casing axis to cause tilting of the detent 18' in the manner described above.

It is a common feature of the several embodiments of the invention described above and illustrated in the drawing that they consist of relatively few, rugged elements whose functions are not significantly affected by wear during ordinary use. Each tensioning device consists of two sub-assemblies respectively constituted by a casing and associated normally stationary parts and by a tensioning member and associated springs, abutment elements, and pressure transmitting elements. The sub-assemblies may be separated from each other without risking the loss of components from either when elementary precautions are taken, as by inverting the devices from the illustrated position prior to disassembly. Even such precautions, however, are unnecessary in the device of FIGS. 1–3, 5, and 6.

In each of the tensioning devices, the detent is locked even more firmly in its axial position by the oblique bottom face of the cooperating pressure transmitting sleeve under axial inward pressure exerted on the tensioning member, yet the detent offers minimal resistance to outward movement of the tensioning member under the pressure of the associated springs which may be made very light. In all illustrated embodiments, the detent is interposed between the spring mainly responsible for driving the tensioning member outward of the casing, and a sleeve employed for transmitting the force of the spring to the tensioning member, but it is not necessary, while convenient for manufacturing purposes, that the oblique face engaging the detent be located on an element separate from and movable relative to the tensioning member, as will be evident from consideration of FIGS. 7 to 9.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A tensioning device for a chain and like tension element which comprises:
    (a) a casing having an open end;
    (b) a tensioning member having a first portion normally received in said casing and a second portion outside said casing, said first portion being guided in said casing for movement of said member in a direction inward and outward of said casing through said open end;
    (c) connecting means on said second portion for operatively connecting said tensioning member to said tension element;
    (d) locking means in said casing for substantially preventing movement of said tensioning member in said inward direction under forces applied to said connecting means, said locking means including
        (1) an abutment member formed with two rows of receptacles, each row extending in said direction and being spaced transversely from the other row, and
        (2) a detent member extending in a plane and dimensioned for simultaneous engagement with respective receptacles of said rows when said plane is obliquely inclined relative to said direction;
    (e) yieldably resilient means in said casing for biasing said detent member in said direction outward of said casing; and
    (f) pressure transmitting means interposed between said detent member and said tensioning member for transmitting the biasing force of said yieldably resilient means from said detent member to said tensioning member,
        (1) said pressure transmitting means having a face portion defining an abutment face for engagement with said detent member, said abutment face being obliquely inclined relative to said direction.

2. A device as set forth in claim 1, wherein said abutment member is a flat strip member elongated in said direction and having two longitudinal edge portions formed with said receptacles.

3. A device as set forth in claim 2, wherein said edge portions have respective rows of sawtooth-shaped projections, each projection having a short flank and a long flank converging toward a point, said long flanks being inclined relative to said direction at a smaller angle than said short flanks.

4. A device as set forth in claim 1, wherein said abutment member is a column elongated in said direction and formed with annular grooves spaced in said direction, respective portions of each groove constituting receptacles of said two rows.

5. A device as set forth in claim 4, wherein respective pairs of said grooves consecutive in said direction bound surface portions of said column, said surface portions being convexly arcuate in section through the longitudinal axis of said column.

6. A device as set forth in claim 1, wherein said detent member is annular.

7. A device as set forth in claim 6, wherein said abutment member is an elongated strip member having toothed edge portions, the teeth of said edge portions defining said rows of receptacles therebetween, said detent member extending about said strip member, the greatest internal diameter of said detent member being only slightly greater than the greatest width of said strip member between said edge portions.

8. A device as set forth in claim 1, wherein said abutment member is elongated in said direction and has an end portion remote from said open end, abutment means on said end portion, said yieldably resilient means including a helical spring coiled about said abutment member and engaged said abutment means and said detent member.

9. A device as set forth in claim 1, wherein said first portion is tubular, and the cavity of said first portion at least partly encloses said locking means, said yieldably resilient means, and said pressure transmitting means.

10. A device as set forth in claim 9, further comprising lubricating means for admitting a lubricant to said cavity, said second portion being formed with a lubricating duct communicating with said cavity and open in said direction, and throttling means in said duct for throttling the flow of lubricant through said duct.

11. A device as set forth in claim 1, wherein said pressure transmitting means include a pressure transmitting member movable in said casing in said direction and having said face portion, and a compression spring interposed in said direction between said pressure transmitting member and said tensioning member.

12. A device as set forth in claim 11, further comprising securing means on said pressure transmitting member and on said abutment member engageable for limiting relative movement of said last-mentioned members in said direction and for thereby securing the same to each other when removed from said casing.

13. A device as set forth in claim 1, wherein said abutment member is formed with a recess adjacent the end of one of said rows remote from said open end, said recess being dimensioned to receive a portion of said detent member and for thereby preventing movement of said detent member under the pressure of said yieldably resilient means, and cam means in said casing adjacent the end of the other one of said rows, said cam means being connected to said tensioning member for joint movement in said direction and dislodging said detent member from said recess when said cam means is moved inward of said casing with said tensioning member.

14. A device as set forth in claim 1, wherein said pressure transmitting means include a pressure transmitting member movable in said casing in said direction and having said face portion, and bayonet closure means on said abutment member and said pressure transmitting member for preventing relative movement of said two last-mentioned members in said direction when said detent member is near the ends of said rows remote from said open end.

15. A device as set forth in claim 14, further comprising cam means responsive to relative angular displacement of said two members for releasing said bayonet closure means.

16. A device as set forth in claim 1, further comprising means limiting movement of said tensioning member in said direction inward of said casing to a terminal position, said yieldably resilient means including a helical spring member coiled about said abutment, and spring deactivating means for preventing biasing of said detent member by said spring member when said tensioning member is adjacent said terminal position thereof, said abutment member being a column having an axis extending in said direction, and said spring deactivating means including a circumferentially extending rib on said column, said spring member having a terminal turn dimensioned to abut against said rib when said turn extends substantially in a plane radial relative to said axis, and when said rib is axially interposed between said turn and said detent member, said turn being dimensioned to move axially over said rib when extending in a plane oblique to said axis.

17. A device as set forth in claim 16, said spring additional turns offset from said terminal turn in an axial direction away from said open end and greater in diameter than said terminal turn, said additional turns being dimensioned to move freely over said rib in an axial direction.

References Cited
FOREIGN PATENTS

| | | | |
|---|---|---|---|
| 690,684 | 7/1964 | Canada | 74—242.11 S |
| 1,013,876 | 12/1965 | Great Britain | 74—242.11 S |
| 1,018,211 | 1/1966 | Great Britain | 74—242.11 S |

LEONARD H. GERIN, Primary Examiner

U.S. Cl. X.R.

74—242.14 R